(12) United States Patent
Showell

(10) Patent No.: US 11,718,338 B2
(45) Date of Patent: Aug. 8, 2023

(54) STROLLER WITH HEATING AND COOLING SEAT

(71) Applicant: Amina Showell, Santa Teresa, NM (US)

(72) Inventor: Amina Showell, Santa Teresa, NM (US)

( * ) Notice: Subject to any disclaimer, the term of this patent is extended or adjusted under 35 U.S.C. 154(b) by 0 days.

(21) Appl. No.: 17/479,352

(22) Filed: Sep. 20, 2021

(65) Prior Publication Data
US 2023/0094092 A1 Mar. 30, 2023

(51) Int. Cl.
*B62B 9/10* (2006.01)
*B62B 9/14* (2006.01)
*B62B 9/20* (2006.01)
*B62B 9/12* (2006.01)
*B62B 11/00* (2006.01)
*G01K 3/00* (2006.01)

(52) U.S. Cl.
CPC .............. *B62B 9/142* (2013.01); *B62B 9/102* (2013.01); *B62B 9/12* (2013.01); *B62B 9/20* (2013.01); *B62B 11/00* (2013.01); *G01K 3/005* (2013.01); *B62B 2204/02* (2013.01); *B62B 2204/04* (2013.01)

(58) Field of Classification Search
CPC ... B62B 9/142; B62B 9/14; B62B 9/102; B62B 9/12; B62B 9/20; B62B 11/00; B62B 2204/02; B62B 2204/04; G01K 3/005
See application file for complete search history.

(56) References Cited

U.S. PATENT DOCUMENTS

| | | | |
|---|---|---|---|
| 2,812,949 A * | 11/1957 | Munro | B62B 7/06 280/643 |
| 6,127,655 A | 10/2000 | Humes et al. | |
| 7,568,721 B2 | 8/2009 | Huang | |
| 8,011,693 B2 * | 9/2011 | Nooshin | A61G 5/10 280/647 |
| 8,118,364 B2 | 2/2012 | Davis | |
| 9,452,769 B1 * | 9/2016 | Williams et al. | A47C 7/748 |
| 9,669,858 B2 * | 6/2017 | Washington et al. | B62B 9/005 |
| 9,796,405 B2 * | 10/2017 | Li et al. | B62B 7/062 |
| 11,267,379 B2 * | 3/2022 | Abreu | B60N 2/5642 |
| 2013/0015689 A1 * | 1/2013 | Maclary et al. | A47G 9/068 297/219.12 |
| 2014/0132043 A1 | 5/2014 | Rodormer | |
| 2015/0028639 A1 * | 1/2015 | Brown | A47G 9/068 297/184.13 |
| 2016/0347220 A1 * | 12/2016 | Brown | B60N 2/58 |
| 2019/0109272 A1 * | 4/2019 | Kozlowski et al. | H10N 10/17 |
| 2022/0063696 A1 * | 3/2022 | Jackson | B62B 9/26 |

* cited by examiner

*Primary Examiner* — John D Walters
(74) *Attorney, Agent, or Firm* — Boudwin Intellectual Property; Daniel Boudwin

(57) ABSTRACT

A stroller includes a frame, a handle, a plurality of support legs, a wheel attached to a lower end of each support leg, and a seat attached to the frame. The seat includes an internal Peltier device for selectively heating or cooling the seat. The Peltier device is powered via an onboard battery installed in an electronics housing that includes multiple USB ports. A blanket is removably secured to the seat via one or more fasteners. A processor in the electronics housing performs a method that includes activating the Peltier device to bring the seat to a preset temperature, receiving a temperature setting for the Peltier device from a temperature control button disposed on the handle, detecting a current temperature of an area within the seat, and if the current temperature of the area within the seat is greater than a threshold safe upper temperature, then deactivating the Peltier device.

15 Claims, 9 Drawing Sheets

STROLLER WITH HEATING AND COOLING SEAT

BACKGROUND OF THE INVENTION

The present invention relates to strollers having electronic components. More particularly, the present invention provides a stroller having a removably attached blanket and a seat with a Peltier device for selectively heating or cooling the seat.

Strollers are utilized to transport children in a safe and comfortable manner when they are unable to or do not want to walk. Typical strollers include a seating area for the child, wheels for support, and a handle for pushing the stroller. Individuals must sometimes use strollers and be outside in the elements during more extreme weather conditions, such as hot days, cold days, or rainy days. During such conditions, it is important to ensure the child in the stroller is protected from the elements. During very cold conditions, some individuals will secure a blanket over the stroller. However, this is only a partial solution, as the blanket does not always provide enough warmth for the conditions. Further, a typical blanket can often be difficult to keep in place while covering the child in the stroller. During hot days, individuals can utilize ice packs or other methods to keep the occupant of the stroller cool. However, these methods can be time consuming and difficult to maintain over longer periods of time.

In order to address these concerns, the present invention provides a stroller having a Peltier device for heating or cooling the seating area. Specifically, the stroller includes a removable blanket and a seat with a Peltier device for controlling the temperature of the seat. The stroller thus helps to regulate the temperature of the occupant and keep them comfortable and safe no matter the environmental conditions. Further, the stroller includes a temperature control circuit that shuts down the Peltier device when a temperature above a safe threshold level is detected. In this way, the stroller provides a safe way to transport a child and regulate their temperature in different weather conditions.

Devices have been disclosed in the known art that relate to transportation devices such as seats and strollers with heating and cooling mechanisms. These include devices that have been patented and disclosed in patent application publications. However, the devices in the known art have several drawbacks. These devices are typically only able to heat or cool, rather than being capable of both functions to maintain an ideal environment for the stroller occupant. Further, the devices in the known art lack the adjustability provided by the stroller of the present invention, and further lack the convenience of additional battery charging ports for connecting additional electronic devices.

SUMMARY OF THE INVENTION

The present invention provides a stroller with a heating and cooling seat wherein the same can be utilized for providing a temperature-controlled environment for the occupant of the stroller. The stroller includes a frame having a rear handle, a plurality of support legs attached to the frame, and a wheel attached to a lower end of each support leg. A seat attached to the frame includes an internal Peltier device for selectively heating or cooling the seat. A blanket is removably secured to the seat via one or more fasteners. The blanket helps to safely secure the occupant within the stroller when it is attached to the seat.

The stroller further includes an electronics housing which houses a battery, a plurality of battery ports, a temperature sensor, a processor, a non-transitory computer readable medium operatively connected to the processor, and a logic stored in the non-transitory computer readable medium that, when executed by the processor, causes the stroller to perform a method. The method includes activating the Peltier device to bring the seat to a preset temperature, receiving a temperature setting for the Peltier device from a temperature control button disposed on the handle, and detecting a current temperature of an area within the seat. If the current temperature of the area within the seat is greater than a threshold safe upper temperature, then the system deactivates the seat's Peltier device.

One object of the present invention is to provide a stroller having an electronics housing that also functions as a rear standing platform to support the individual pushing the stroller.

Another object of the present invention is to provide a stroller frame that is adjustable and includes a pair of rear wheels and a single front wheel.

A further object of the present invention is to provide a pouch on the stroller for storing the blanket when it is not in use.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
FIG. 1 shows a perspective view of an embodiment of the stroller in use.

Reference is made herein to the attached drawings. Like reference numerals are used throughout the drawings to depict like or similar elements of the stroller with heating and cooling seat. For the purposes of presenting a brief and clear description of the present invention, a preferred embodiment will be discussed as used for providing a stroller with active heating and cooling for maintaining a safe and comfortable temperature for the stroller occupant in different environments. The figures are intended for represen- Referring now to FIG. 1, there is shown a perspective view of an embodiment of the stroller in use. The stroller 10 generally includes a frame 11 having a rear handle 16 attached to a rear portion 23 of the frame 11. The stroller 10 is supported on a front wheel 15 and a pair of rear wheels 14 via a front leg 13 and a pair of rear legs 12 connected to the frame 11. In the shown embodiment, the frame 11 includes an upper portion 23 has one end connected to one end of an adjustable connector 25 on each side of the stroller 11, one of which is shown in FIG. 1. The frame 11 is further defined by a lower portion 22 of the frame 11 that includes opposing ends connected to second ends of the pair of adjustable connectors 25, and a U-shaped support 24 that extends between interior sides of each adjustable connectors 25. The U-shaped support 24 is adapted to support the seat 18 as it is secured to the frame 11. The adjustable connector 25 can be utilized to adjust the angle of the handle 16, as well as the height and angle of the rear wheels 14, with respect to the frame 11.

An electronics housing 21 is attached to the stroller 10 and provides a housing for the battery and other electronic components. The electronics housing 21 also provides a standing platform for the user pushing the stroller 10. Further, the shown embodiment includes an awning 17 which can be movable between an extended position covering the seat 18 and a retracted position against the handle 16. The awning 17 provides additional shade and protection from the elements, but can also be retracted when not needed to provide additional visibility for the stroller occupant.

The seat 18 includes one or more fasteners 20 which are configured to removably secure the blanket 19 to the seat 18. The one or more fasteners 20 can include clips, clamps, buckles, or any other suitable type of connection mechanism for securing the blanket 19 in such a way that it extends overtop the seating area 28. When secured, the blanket 19 also serves as a protective restraint to keep the occupant from falling from or otherwise leaving the seating area 28. Additionally, the seating area 28 includes a Peltier device which is operably connected to the battery and utilized to bring the seating area 28 to a preset temperature.

Figure 2:
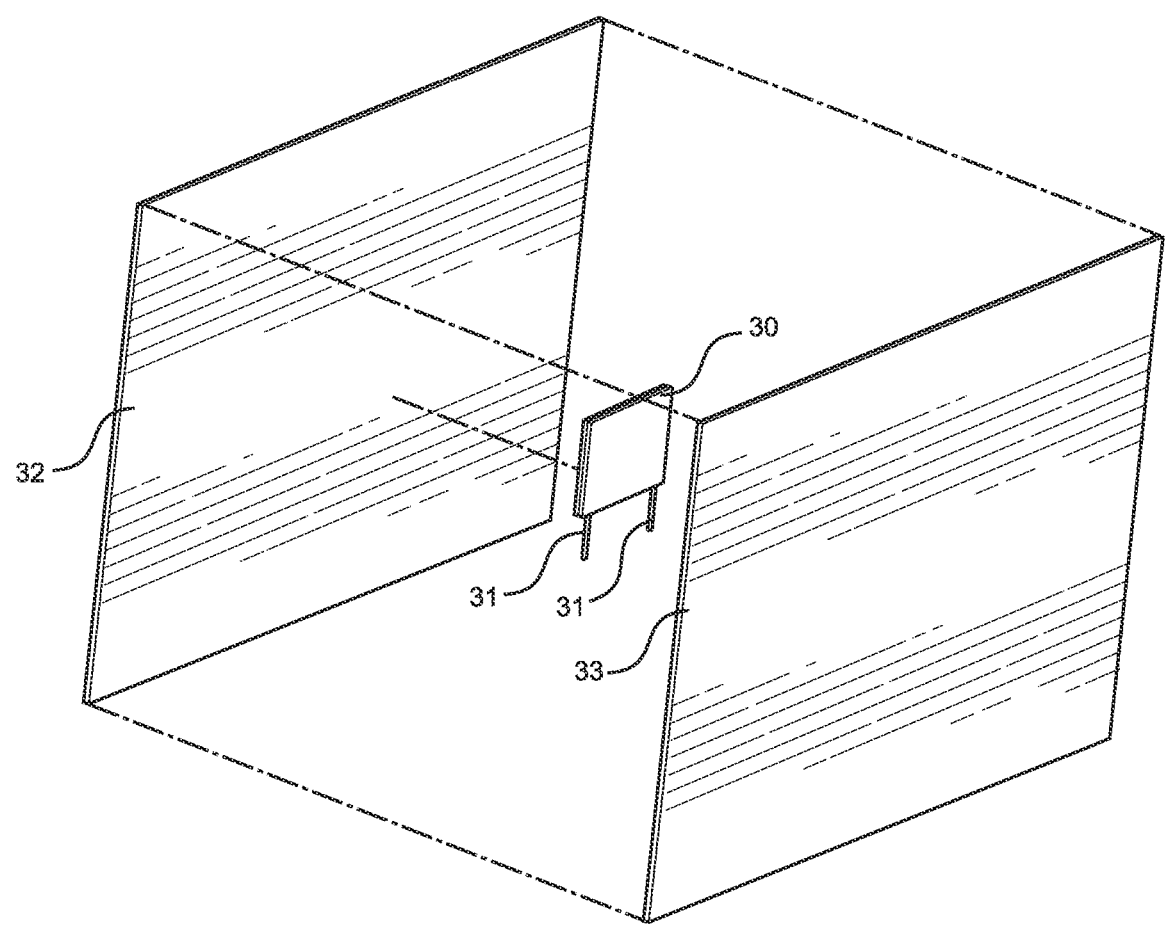
FIG. 2 shows an expanded perspective view of an example Peltier device from an embodiment of the stroller.
Figure 3:
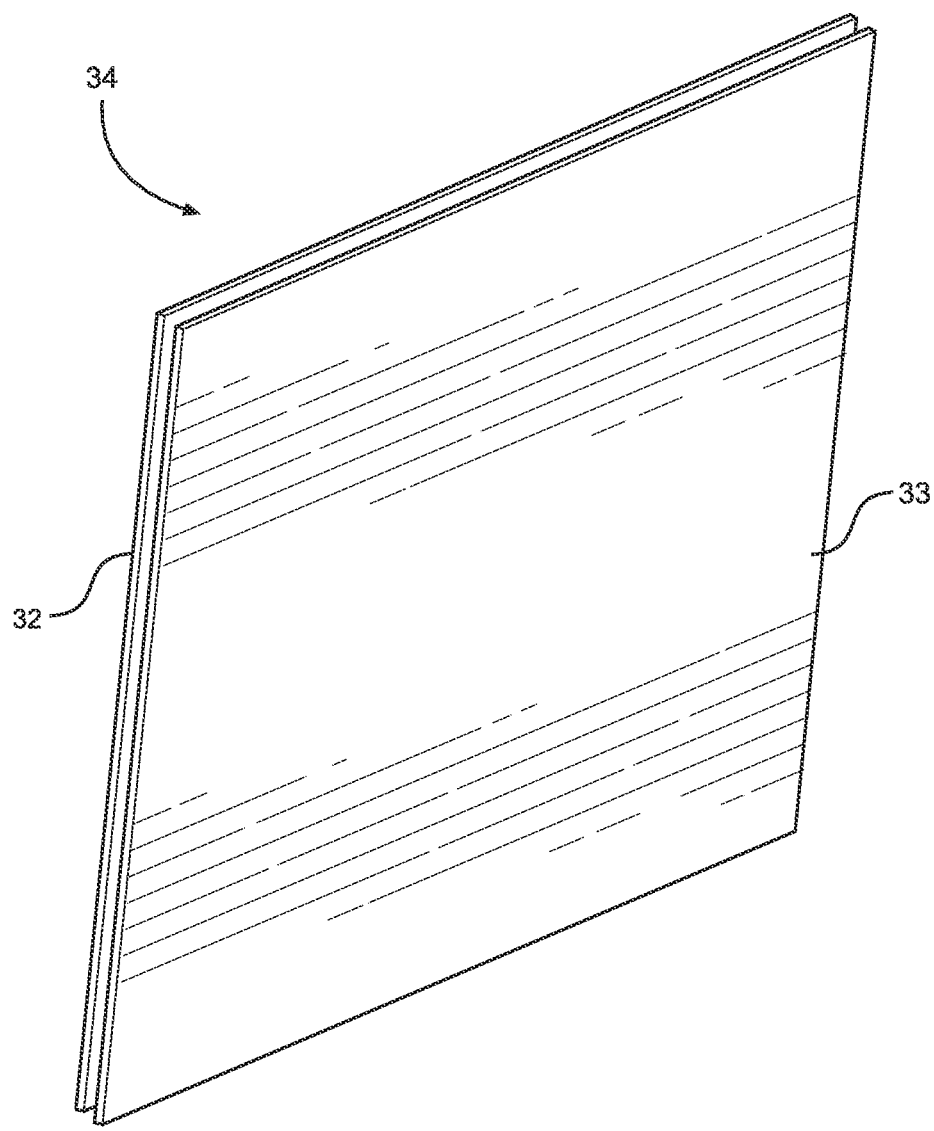
FIG. 3 shows a normal perspective view of an example Peltier device from an embodiment of the stroller.

Referring now to FIGS. 2 and 3, there are shown perspective views of an example Peltier device from an embodiment of the stroller. The Peltier device 30 is a thermoelectric heater or cooler that uses the Peltier effect to form a solid-state active heat pump, which transfers heat from one side of the device 30 to the other, with consumption of electrical energy from a connected power supply. The cold and hot sides depend on the direction of the current through the wire leads 31 that electrically connect the Peltier device to the stroller's battery for power. In the shown embodiment, the Peltier device 30 is surrounded on its opposing sides by a pair of aluminum sheets 32, 33. The aluminum sheets 32, 33 have a high thermal conductivity and help to enhance the heating and cooling properties of the Peltier device 30. When placed together, the Peltier device 30 and the pair of aluminum sheets 32, 33 form a Peltier assembly 34. The stroller includes a Peltier device 30 installed within the lining of the seat, such that the fabric or other material of the seat embeds the aluminum sheets 32, 33 of the Peltier device 30. As an example, the Peltier device 30 can be positioned beneath an outer fabric layer or other outermost layer of the seat construction, preferably along both the lower and seatback portions of the seat. The Peltier device 30 is capable of either heating or cooling the seat.

Figure 4:
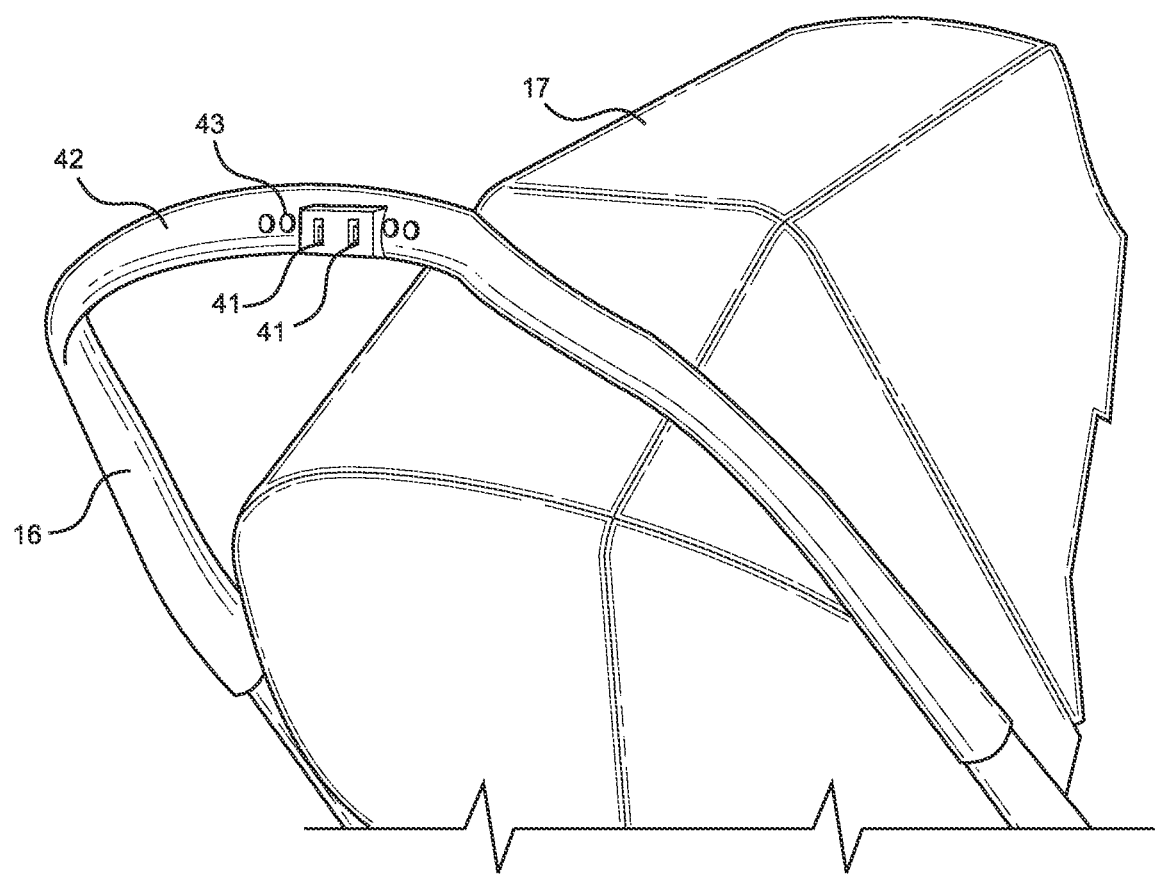
FIG. 4 shows a rear perspective view of the handle from an embodiment of the stroller.

Referring now to FIG. 4, there is shown a rear perspective view of the handle from an embodiment of the stroller. In the shown embodiment, the handle 16 includes a plurality of USB ports 41. Each USB port 41 is operably connected to the battery. In this way, the user can plug in an external device to the handle 16, such as a mobile phone for example, in order to charge the external device's battery with the stroller's battery. Further, the handle 16 includes one or more temperate control buttons 43. For some example functions, the temperature control buttons 43 can be utilized to activate or deactivate the Peltier device in the seat, and to select a desired temperature range for the Peltier device in the seat. The temperature control buttons 43 can also be utilized for other purposes. Also, in the shown embodiment, a grip 42 is disposed overtop the handle 16. The grip 42 can include textured rubber or other materials that facilitate the user in grasping the handle 16.

Figure 5:
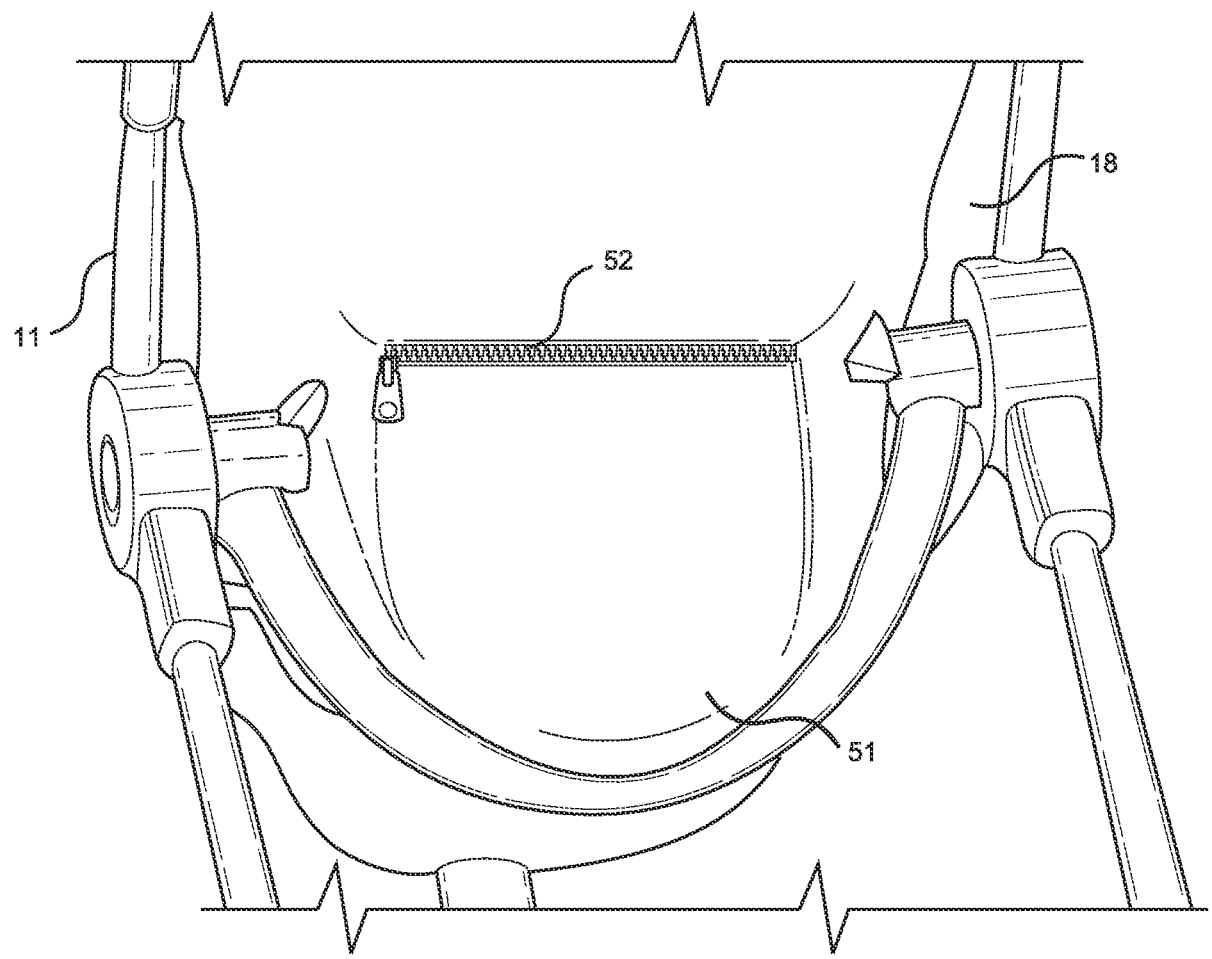
FIG. 5 shows a rear perspective view of the pouch from an embodiment of the stroller.

Referring now to FIG. 5, there is shown a rear perspective view of the pouch from an embodiment of the stroller. In the shown embodiment, the rear side of the seat 18 includes a pouch 51. The pouch 51 is configured to store the blanket when the blanket is removed from the seat 18. In the shown embodiment, the pouch 51 includes a zipper closure fastener 52 which can be utilized to selectively close off the upper open end of the pouch 51. In other embodiments, other types of closure fasteners may be utilized to secure the blanket within the pouch 51 for storage.

Figure 6:
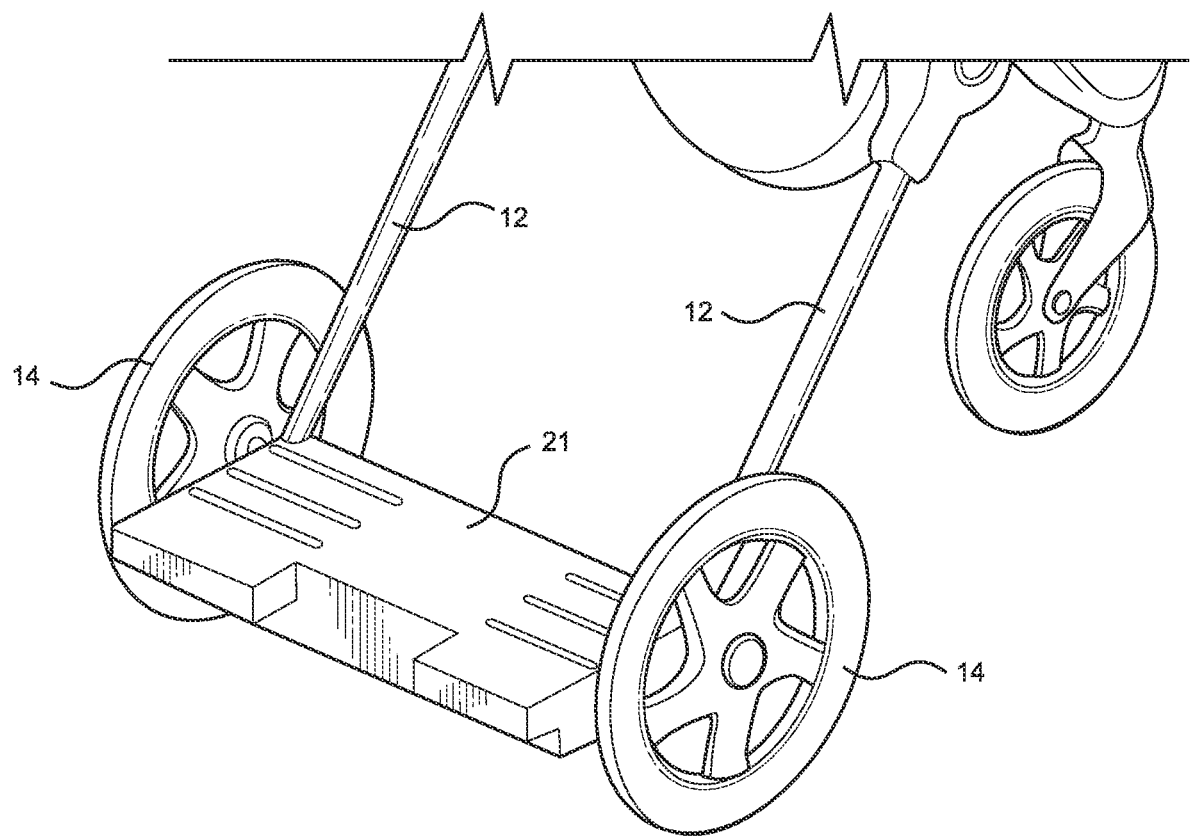
FIG. 6 shows a rear perspective view of the electronics housing from an embodiment of the stroller.
Figure 7:
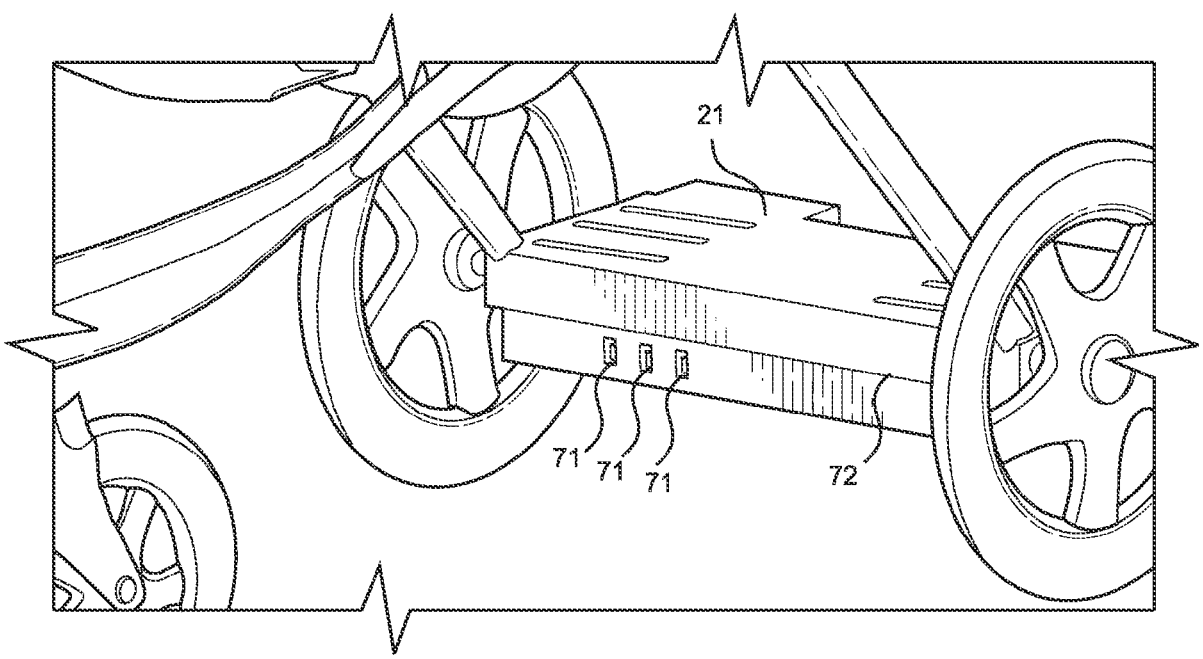
FIG. 7 shows a front perspective view of the electronics housing from an embodiment of the stroller.

Referring now to FIGS. 6 and 7, there are front and rear perspective views of the electronics housing from an embodiment of the stroller. The electronics housing 21 is a platform positioned between the rear legs 12, specifically between the rear wheels 14. The electronics housing 21 platform provides a standing area so individuals pushing the stroller can stand and coast if desired. The platform can include a textured upper surface to assist the user's feet with gripping to the platform. Further, the electronics housing 21 includes a plurality of USB ports 71 which are all operably connected to the internal battery. The USB ports 71 can be utilized to charge the internal battery via a connection to a wall outlet or other power source. Further, the USB ports 71 can be utilized to charge other device's batteries using the stroller's onboard battery. In the shown embodiment, the USB ports 71 are positioned on the front-facing side 72 of the electronics housing 21. This is to prevent cords from connected devices from being tangled in the user's legs behind the electronics housing 21.

Figure 8:
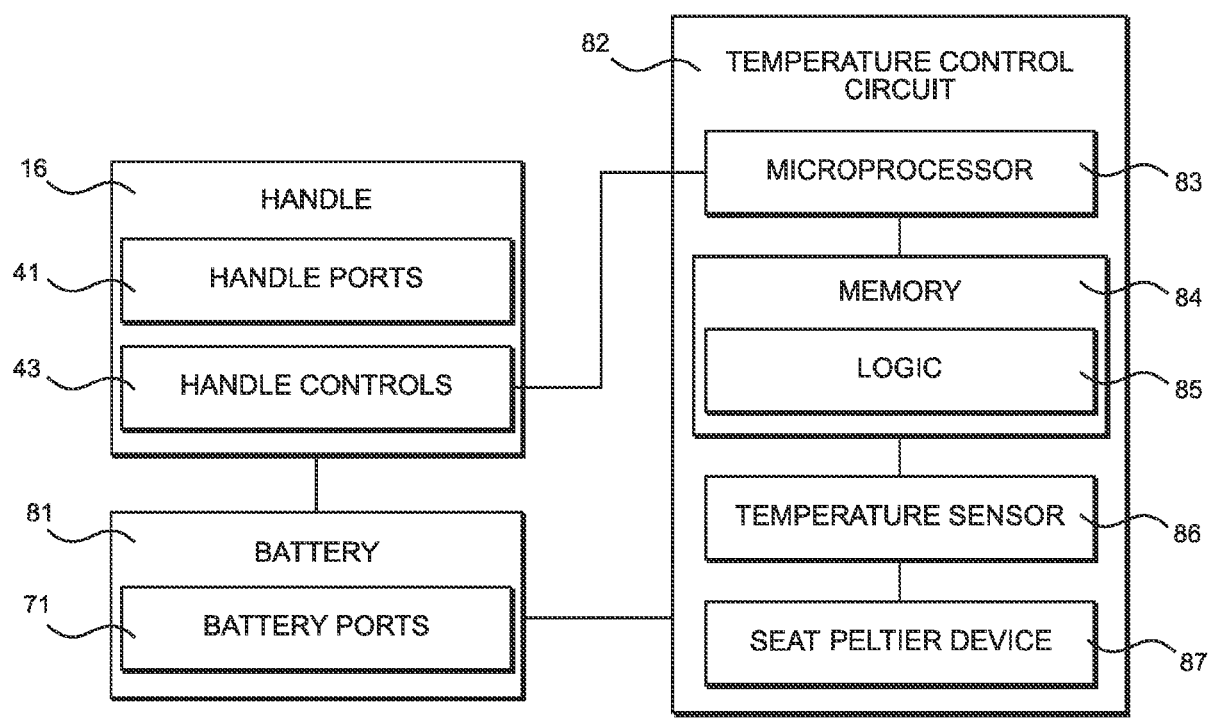
FIG. 8 shows a block diagram of the electronic components from an embodiment of the stroller.

Referring now to FIG. 8, there is shown a block diagram of the electronic components from an embodiment of the stroller. The handle 16 includes handle ports 41 that are operably connected to the battery 81, which is in an electronics housing that includes its own battery ports 71. The electronics housing 21 also includes a temperature control circuit 82 that is utilized to control the Peltier devices of the seat. The handle 16 includes controls 43 that are operably connected to a microprocessor 83. The microprocessor 83 is configured to execute a logic 85 stored on a non-transitory computer readable medium, such as a memory 84. When activated via the temperature controls 43, the microprocessor 83 activates the seat Peltier device 88 to heat or cool the seat to a preset temperature. The microprocessor 83 can also receive a temperature setting for the Peltier device 87 from the temperature controls 43.

The temperature control circuit 82 includes one or more temperature sensors 86 that determine the current temperature of the Peltier device 87 for control purposes. A safety routine is included in the logic 85 to protect the occupant of the stroller from unsafe temperatures. If the temperature detected within the seating area or the area effected by the Peltier device 87 is greater than a threshold, preprogrammed safe upper temperature range, then the microprocessor 83 automatically deactivates the Peltier device 87. If the temperature sensors 86 detect a temperature below the safe threshold level, then the microprocessor 83 keeps the Peltier device 87 activated. The seat Peltier device 87 provides comfortable heating or cooling to a preset temperature to the occupant, and can be adjusted in temperature to provide warmth in colder environments or cooling in warmer environments. Improved safety is provided because the stroller is configured to automatically deactivate the Peltier device 87 in the event of unsafe temperatures being detected.

Figure 9:
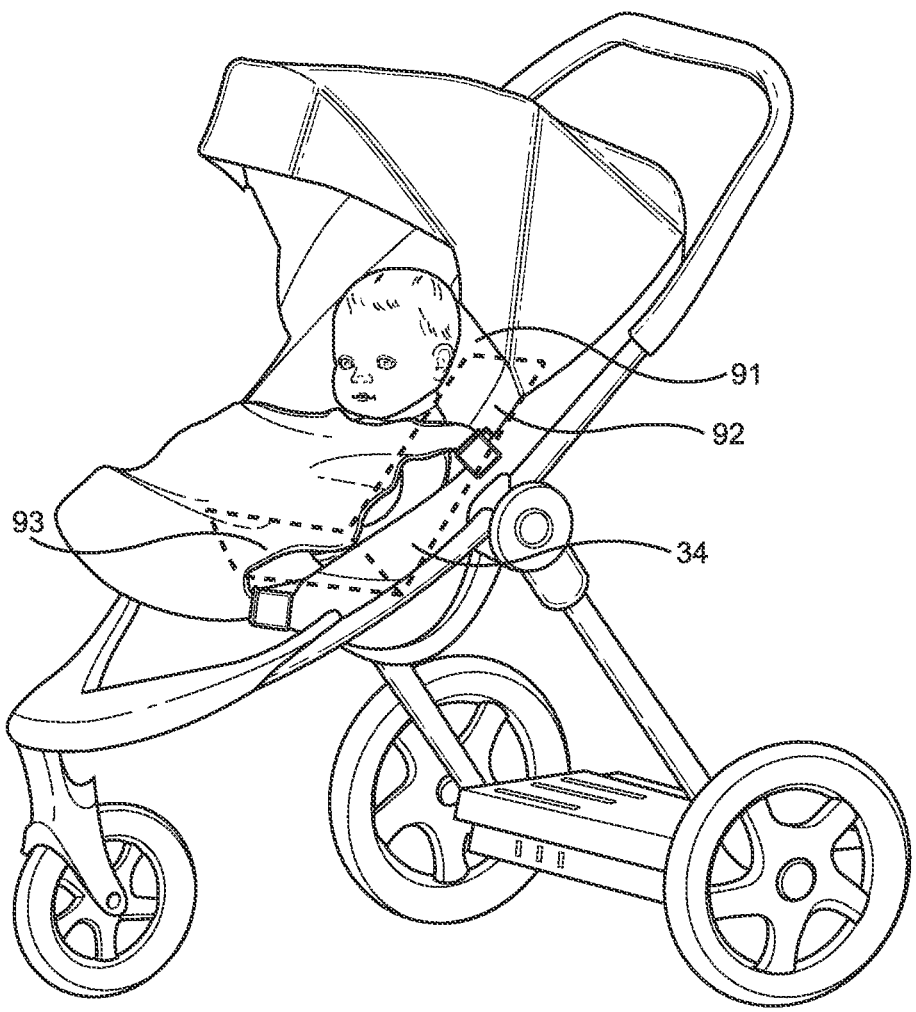
FIG. 9 shows a perspective view of an embodiment of the stroller in use.

Referring now to FIG. 9, there is shown a perspective view of an embodiment of the stroller in use. In the illustrated embodiment, a Peltier assembly is installed within a lining 91 of the seat, such that the Peltier assembly is beneath an outermost layer of the seat along both a lower portion 93 of the seat and a seatback portion 92 of the seat. As such, heating and cooling will be provided to the lower portion 93 of the seat and a seatback portion 92 of the seat.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, and all equivalent relationships to those illustrated in the drawings and described in the specification are intended to be encompassed by the present invention. Therefore, the foregoing is considered as illustrative only of the principles of the invention. Further, it is not desired to limit the invention to the exact construction and operation shown and described, and accordingly, all suitable modifications and equivalents may be resorted to, falling within the scope of the invention.

I claim:

1. A stroller comprising:
   a frame having a rear handle;
   a plurality of support legs attached to the frame;
   a wheel attached to a lower end of each support leg;
   a seat attached to the frame, the seating having an internal Peltier device for selectively heating or cooling the seat, the internal Peltier device disposed between a pair of sheets to form a Peltier assembly that is installed within a lining of the seat, such that the Peltier assembly is beneath an outermost layer of the seat along both a lower portion of the seat and a seatback portions of the seat;
   wherein the pair of sheets are made of a material having a high thermal conductivity such as to help to enhance the heating and cooling properties of the Peltier device;
   a blanket removably secured to the seat via one or more fastener; and
   an electronics housing comprising a battery, a plurality of battery ports, a temperature sensor, a processor, a non-transitory computer readable medium operatively connected to the processor, and a logic stored in the non-transitory computer readable medium that, when executed by the processor, causes the stroller to perform a method
   wherein the method performed regulates the temperature of the Peltier device by activating the Peltier device to a preset temperature, detecting a temperature of an area within the seat, and modifying that temperature based on a temperature setting determined by a temperature control button disposed on the handle;
   wherein the Peltier device is deactivated if the current temperature of the area within the seat is greater than a threshold safe upper temperature.

2. The stroller of claim 1, wherein the plurality of support legs comprises a pair of rear legs with two respective rear wheels and a front leg with a respective front wheel.

3. The stroller of claim 2, wherein the electronics housing comprises a platform positioned between the pair of rear legs.

4. The stroller of claim 3, wherein the platform comprises a textured upper surface so as to provide a standing platform for an individual.

5. The stroller of claim 1, further comprising a plurality of USB ports disposed on the electronics housing, wherein each electronics housing USB port is operably connected to the battery.

6. The stroller of claim 5, wherein the plurality of USB ports are disposed on an interior facing side of the electronics housing.

7. The stroller of claim 1, further comprising a plurality of USB ports disposed on the handle, wherein each handle USB port is operably connected to the battery.

8. The stroller of claim 1, further comprising a pouch disposed on a rear side of the seat, wherein the pouch is configured to store the blanket when the blanket is removed from the seat.

9. The stroller of claim 8, wherein the pouch comprises a zipper closure fastener to selectively close an upper end of the pouch.

10. The stroller of claim 1, wherein the blanket configured to restrain a stroller occupant within the seating area when the blanket is secured to the seat via the one or more fasteners.

11. The stroller of claim 1, further comprising a grip disposed overtop the handle.

12. The stroller of claim 1, further comprising an awning affixed to the seat.

13. The stroller of claim 12, wherein the awning is movable between an extendable position covering the seat and a retracted position against the handle.

14. The stroller of claim 1, wherein the frame comprises an upper portion having opposing ends connected to first ends of a pair of adjustable connectors, a lower portion having opposing ends connected to second ends of the pair of adjustable connectors, and a U-shaped support extending between interior sides of each adjustable connector, wherein the U-shaped support is adapted to support the seat within the frame.

15. The stroller of claim 14, wherein the connector is configured to adjust the angle of the handle and the angle of the rear wheels with respect to the lower portion of the frame.

* * * * *